US008762872B2

(12) United States Patent
Chou

(10) Patent No.: US 8,762,872 B2
(45) Date of Patent: Jun. 24, 2014

(54) INTUITIVE FILE TRANSFER METHOD

(75) Inventor: Pei-Yin Chou, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 812 days.

(21) Appl. No.: 12/591,170

(22) Filed: Nov. 12, 2009

(65) Prior Publication Data

US 2010/0138743 A1 Jun. 3, 2010

(30) Foreign Application Priority Data

Nov. 28, 2008 (CN) .......................... 2008 1 0219482

(51) Int. Cl.
*G06F 3/048* (2013.01)
*G06F 13/00* (2006.01)

(52) U.S. Cl.
CPC ..................... *G06F 13/00* (2013.01)
USPC .......................................... 715/771; 715/780

(58) Field of Classification Search
CPC ................................................ G06F 13/00
USPC ........................................ 715/769; 345/769
See application file for complete search history.

(56) References Cited

U.S. PATENT DOCUMENTS

| 5,764,873 | A | * | 6/1998 | Magid et al. | 715/769 |
| 5,845,282 | A | * | 12/1998 | Alley et al. | 1/1 |
| 5,886,699 | A | * | 3/1999 | Belfiore et al. | 715/843 |
| 6,344,861 | B1 | * | 2/2002 | Naughton et al. | 715/769 |
| 6,545,669 | B1 | | 4/2003 | Kinawi et al. | |
| 6,757,698 | B2 | * | 6/2004 | McBride et al. | 1/1 |
| 6,820,094 | B1 | * | 11/2004 | Ferguson et al. | 1/1 |
| 7,913,179 | B2 | * | 3/2011 | Sheha et al. | 715/769 |
| 2002/0060701 | A1 | * | 5/2002 | Naughton et al. | 345/853 |
| 2003/0132967 | A1 | * | 7/2003 | Gangadharan | 345/769 |
| 2004/0044723 | A1 | * | 3/2004 | Bell et al. | 709/203 |
| 2004/0044724 | A1 | * | 3/2004 | Bell et al. | 709/203 |
| 2006/0136828 | A1 | | 6/2006 | Asano | |
| 2007/0076102 | A1 | * | 4/2007 | Date | 348/231.99 |
| 2007/0146347 | A1 | | 6/2007 | Rosenberg | |
| 2007/0211159 | A1 | | 9/2007 | Hara et al. | |
| 2008/0256471 | A1 | * | 10/2008 | Okamoto | 715/769 |
| 2010/0257471 | A1 | * | 10/2010 | Ang et al. | 715/769 |

FOREIGN PATENT DOCUMENTS

CN 1386213 A 12/2002

* cited by examiner

*Primary Examiner* — William Titcomb

(57) ABSTRACT

An intuitive file transfer method transfers a selected file from a source device to a selected destination device based on intuitive operation of file transferring. The source device and the destination device are connected by a data transmission device. The source device and the destination device are both provided with a storage device and are both loaded with an intuitive file transfer program. After initialization, the source device and the destination device start the intuitive file transfer programs, which detect if a user uses a pointing device to select an object icon to be transferred in a display area of the source device. When the selected object icon is detected to be moved by the user through a predetermined pointing operation, source data associated with the selected object icon are transmitted through the data transmission device to the storage device of the destination device.

17 Claims, 16 Drawing Sheets

INTUITIVE FILE TRANSFER METHOD

FIELD OF THE INVENTION

The present invention relates to transferring of files, and in particular to an intuitive file transfer method.

BACKGROUND OF THE INVENTION

With the progress of computer technology, besides the improvement made in both hardware and upgrading of application functions of software, user-friendliness of operation and use of computers is also a vitally important challenge to the computer industry.

The conventional man-machine interface is designed to make a computer an easily operating tool that helps a user to complete a desired task, and thus, in the respect of the use thereof, the design must be easy to learn, easy to operate, and allowing for precise control of progress of the desired task or data processing. A good man-machine interface must be designed to provide excellent interaction with the users in order to improve efficiency, quality, and even pleasure of using the computer.

In designing the operation flow performed by a user, since most users do not have sufficient knowledge of the computers, the design must be in such a way that a response is provided for each action taken by the user, so that the user can get aware of the computer being processing the action taken by the computer through immediate response. This certainly improves the convenience of operation of computers to most computer users.

SUMMARY OF THE INVENTION

However, in the design of the currently prevailing operation system, Microsoft Windows®, a user can select a file or a file folder to be moved through clicking and the selected file or file folder to be moved is moved by dragging to a destination device. Besides moving a file or file folder with "drag", movement of files or file folders can also be done with the so called "click lock", which makes file movement easier. When a user is doing text selection or dragging of files, the dragging operation can be done without constantly holding down a mouser button.

The above discussed conventional operations of "drag" and "click lock" provide a limited function of movement of files or file folders. To copy or transfer a file or a file folder to a selected destination device, other function keys, such as pressing Ctrl key plus a character key "C" or a menu pulled down by clicking a right button of mouse to allow for selection of the "copy" function that copies and transfers the selected files or file folders to the selected destination device. This process of copying and transferring selected files or file folders requires the operation of additional menu and function keys, and this the process becomes complicated.

Thus, an objective of the present invention is to provide an intuitive file transfer method, which is operated with intuitive file transfer programs for direct transmission of source data associated with an object icon selected by a user to a selected destination device.

Another objective of the present invention is to provide a user with an operation for identifying a file to be transferred in an intuitive and easily-operating manner.

The solution adopted in the present invention to overcome the problems of the conventional techniques comprises operating intuitive file transfer programs in accordance with the preset invention to carry out automatic detection of the selection of an object icon in a display area of the source device by a user operating a pointing device, either indirectly with a mouse controlling a cursor or directly with finger touching, and to identify the source data with which the object icon is associated.

The intuitive file transfer programs may further detect a predetermined pointing operation carried out by a user that moves the object icon to a designated boundary of the display area through dragging or that moves the object icon to an unoccupied location in the display area, and identify the operation of copying and transferring of the source data associated with the object icon.

Finally, through a data transmission device connected between the source device and the destination device, such as a transmission line of a wired transmission interface that is connected to the source device and the destination device through wired transmission ports, or a wireless connection established by wireless transmission devices connected to the source device and the destination device, the source data associated with the selected object icon can be transmitted to a storage device of the destination device.

The technical solution provided by the present invention allows for copy and transfer of selected files or file folders to a selected destination device without additionally employing function keys, such as Ctrl key plus a character key "C", or without additionally pulling down a menu for working with the right mouse button for execution of the function of copying, whereby the intuitive file transfer method in accordance with the present invention may directly transmit source data associated with an object icon of selected file or file folder to a selected destination device.

To copy or transfer the selected file or file folder by moving the associated object icon by dragging to a boundary of a display area or moving to an unoccupied location in the display area is an intuitive manner of operation of moving the file or file folder out of the source device, which complies with the recognition and behavior of a user, providing a function of simply identifying file transferring and learning of the operation of transferring files.

BRIEF DESCRIPTION OF THE DRAWINGS

The present invention will be apparent to those skilled in the art by reading the following description of preferred embodiments of the present invention and the best mode for carrying out the present invention, with reference to the attached drawings, in which.

DETAILED DESCRIPTION OF THE PREFERRED EMBODIMENTS

Figure 1:
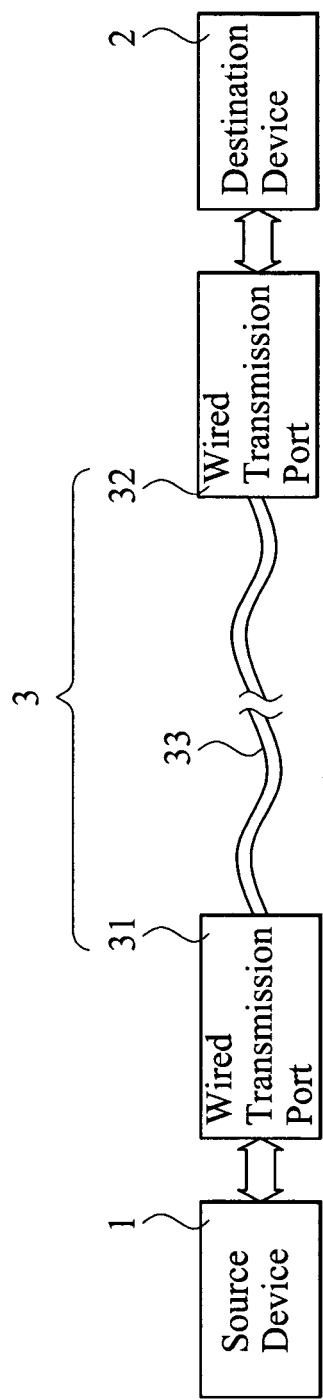
FIG. 1 shows a system block diagram for wired transfer with an intuitive file transfer method in accordance with the present invention.

With reference to the drawings and in particular to FIG. 1, which shows a system block diagram for wired transfer with an intuitive file transfer method in accordance with the present invention, the system of the present invention comprises a source device 1, a destination device 2, and a data transmission device 3. The source device 1 is set in connection with the destination device 2 through the data transmission device 3. The data transmission device 3 comprises a wired transmission port 31 connected to the source device 1 and a wired transmission port 32 connected to the destination device 2, and a transmission line 33 connecting between the wired transmission ports 31, 32 for transmission of data from the source device 1 to the destination device 2.

Figure 2:
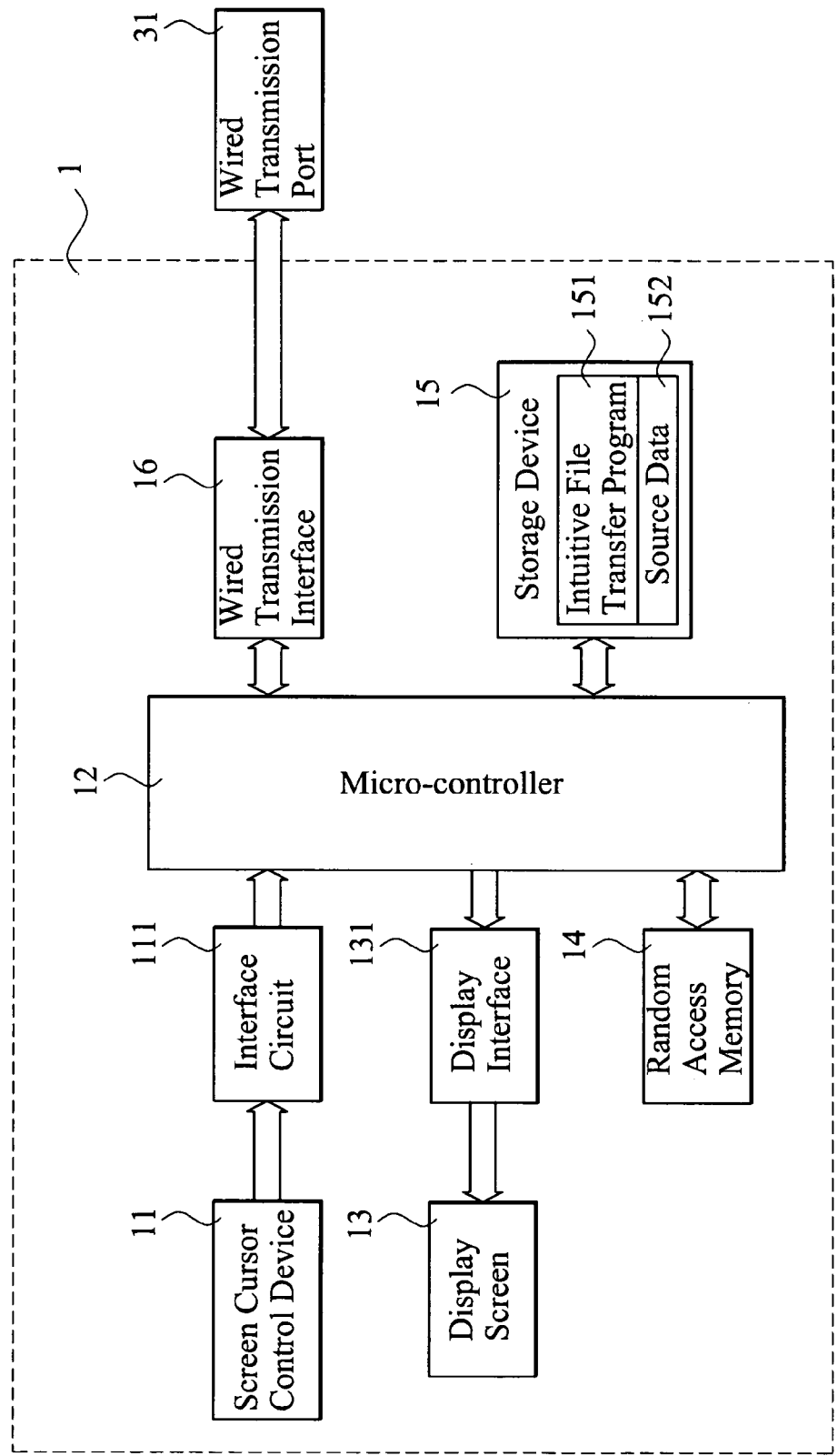
FIG. 2 shows a system block diagram of a source device of the embodiment shown in FIG. 1.

FIG. 2 shows a system block diagram of the source device of the embodiment shown in FIG. 1. The source device 1 comprises a screen cursor control device 11, serving as an input device and transmitting a trace signal to a micro-controller 12 through an interface circuit 111. A display screen 13 receives an image signal from the micro-controller 12 through a display interface 131 and displays the image signal on the screen.

The micro-controller 12 is connected to a random access memory 14, a storage device 15, and a wired transmission interface 16. The storage device 15 stores an intuitive file transfer program 151 and source data 152. The wired transmission interface 16 is in connection with the wired transmission port 31. Further, the destination device of the embodiment of FIG. 1 has the same system architecture as the source device shown in the system block diagram of FIG. 2.

Figure 3:
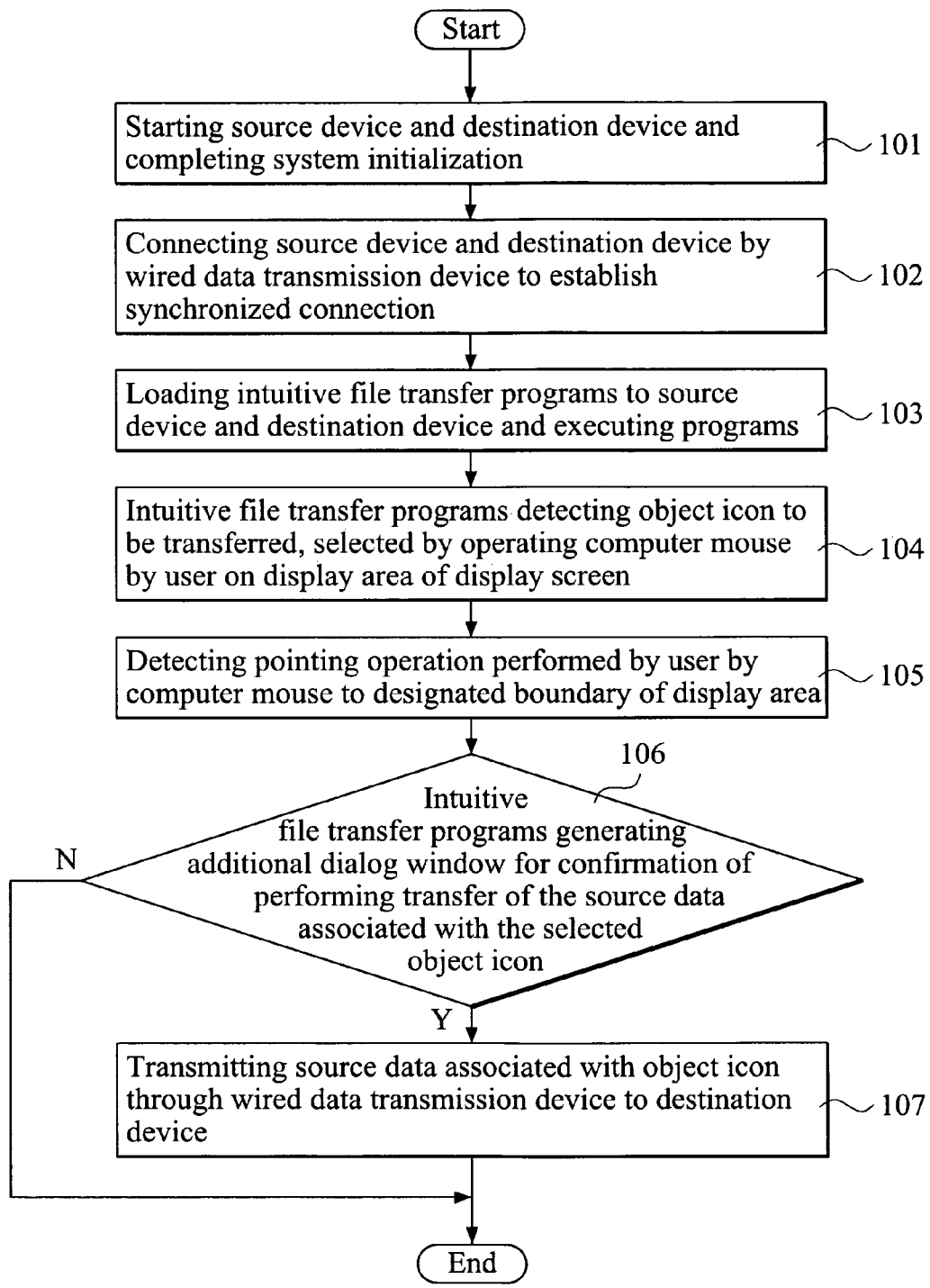
FIG. 3 shows a flow chart of an intuitive file transfer method in accordance with a first embodiment of the present invention.

Referring to FIG. 3, a flow chart of an intuitive file transfer method in accordance with a first embodiment of the present invention is shown. Firstly, both the source device and the destination device are started up and system initialization is completed (Step 101), and a wired data transmission device, such as a USB (Universal Serial Bus) transmission cable, is connected between the wired transmission port of the source device and the wired transmission port of the destination device to establish synchronized connection (Step 102).

Figure 4:
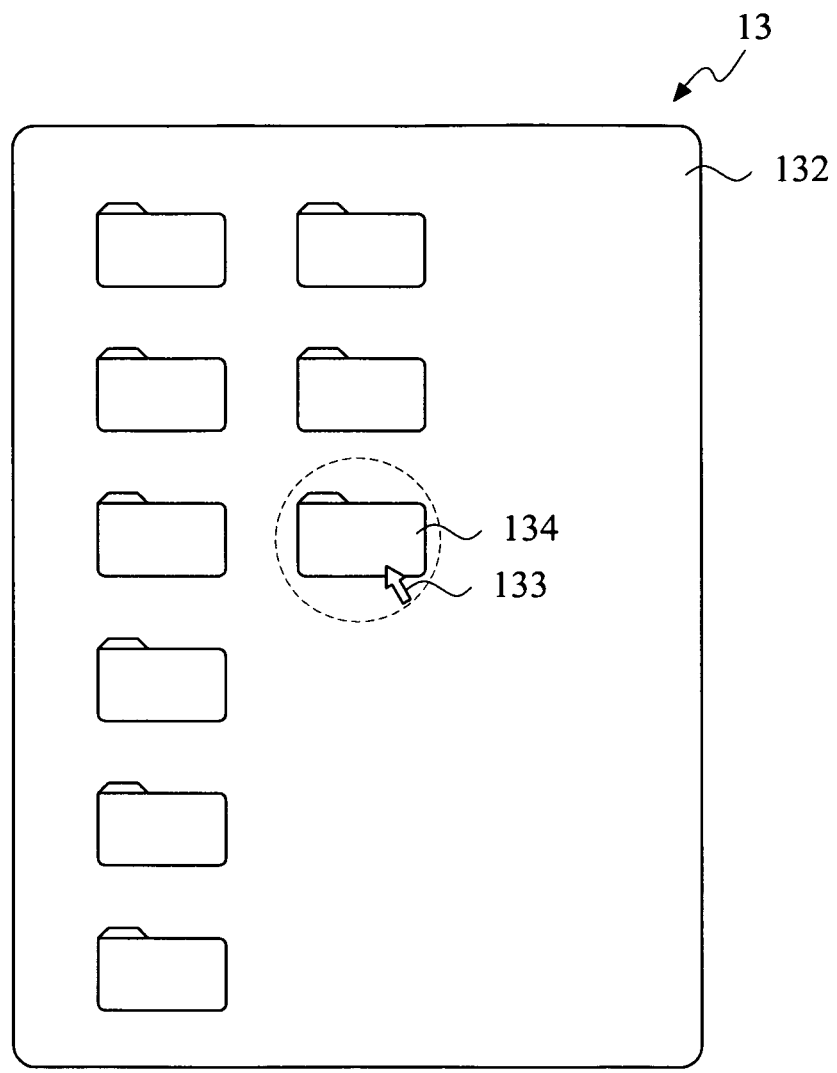
FIG. 4 is a schematic view demonstrating selection of an object icon in a display area with a computer mouse.

To perform the intuitive file transfer method in accordance with the present invention, the source device and the destination device are loaded with intuitive file transfer programs in storage devices thereof and the programs are executed in the random access memories connected to the micro-controllers (Step 103). The intuitive file transfer programs start and detect an object icon 134 to be transferred, as indicated by a phantom line circle of FIG. 4, selected by a user by operating a screen cursor control device, such as a computer mouse or a track ball, to control a screen cursor 133 for clicking on a display area 132 of the display screen 13 (Step 104).

Figure 5:
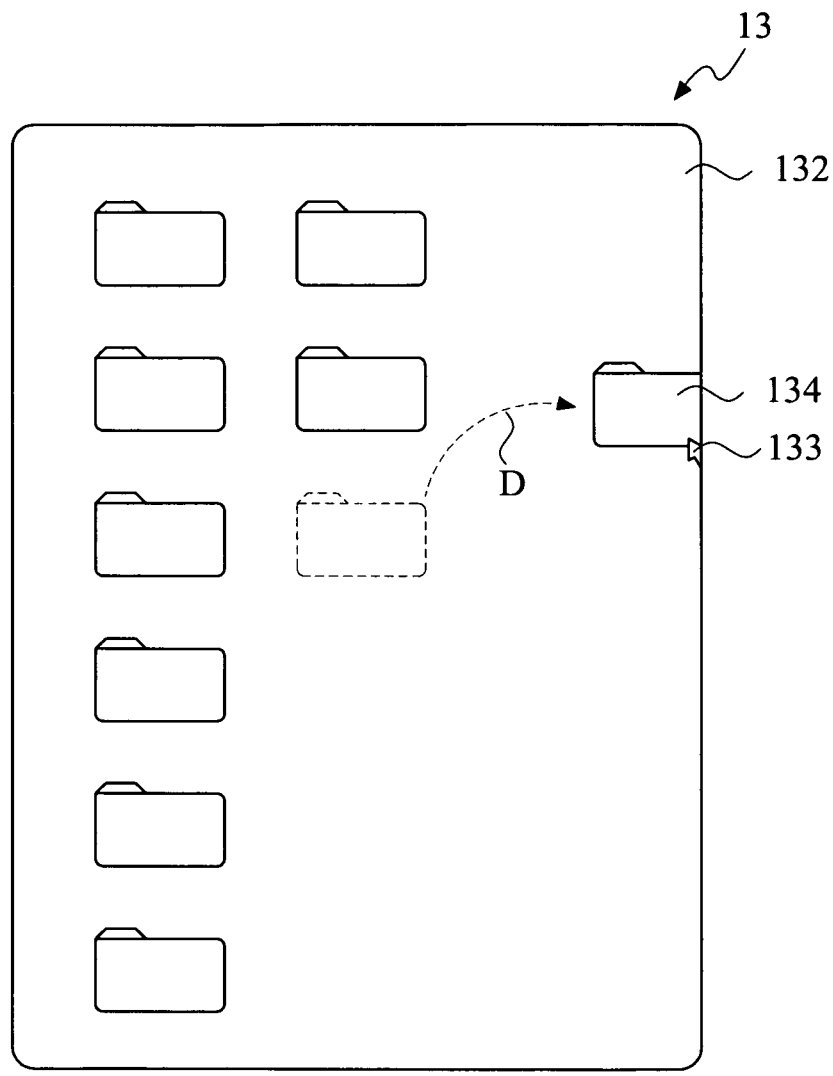
FIG. 5 is a schematic view demonstrating dragging a selected object icon to a boundary of the display area with the computer mouse.

Further, the intuitive file transfer programs also detect a pointing operation performed by the user, such as dragging the object icon 134 (see FIG. 5) by the computer mouse along a dragging trace D to a designated boundary of the display area 13 (Step 105). When the object icon is moved to the designated boundary of the display area, the intuitive file transfer programs generate an additional dialog window for confirmation of performing transfer of the source data that are associated with the selected object icon (Step 106).

After confirmation, the intuitive file transfer programs transmit the source data, such as files or file folders, which are associated with the object icon and stored in the source device, through the wired data transmission device connected between the source device and the destination device to the storage device of the destination device (Step 107). If the confirmation is denied, then the flow skips Step 107 and ends.

Figure 6:
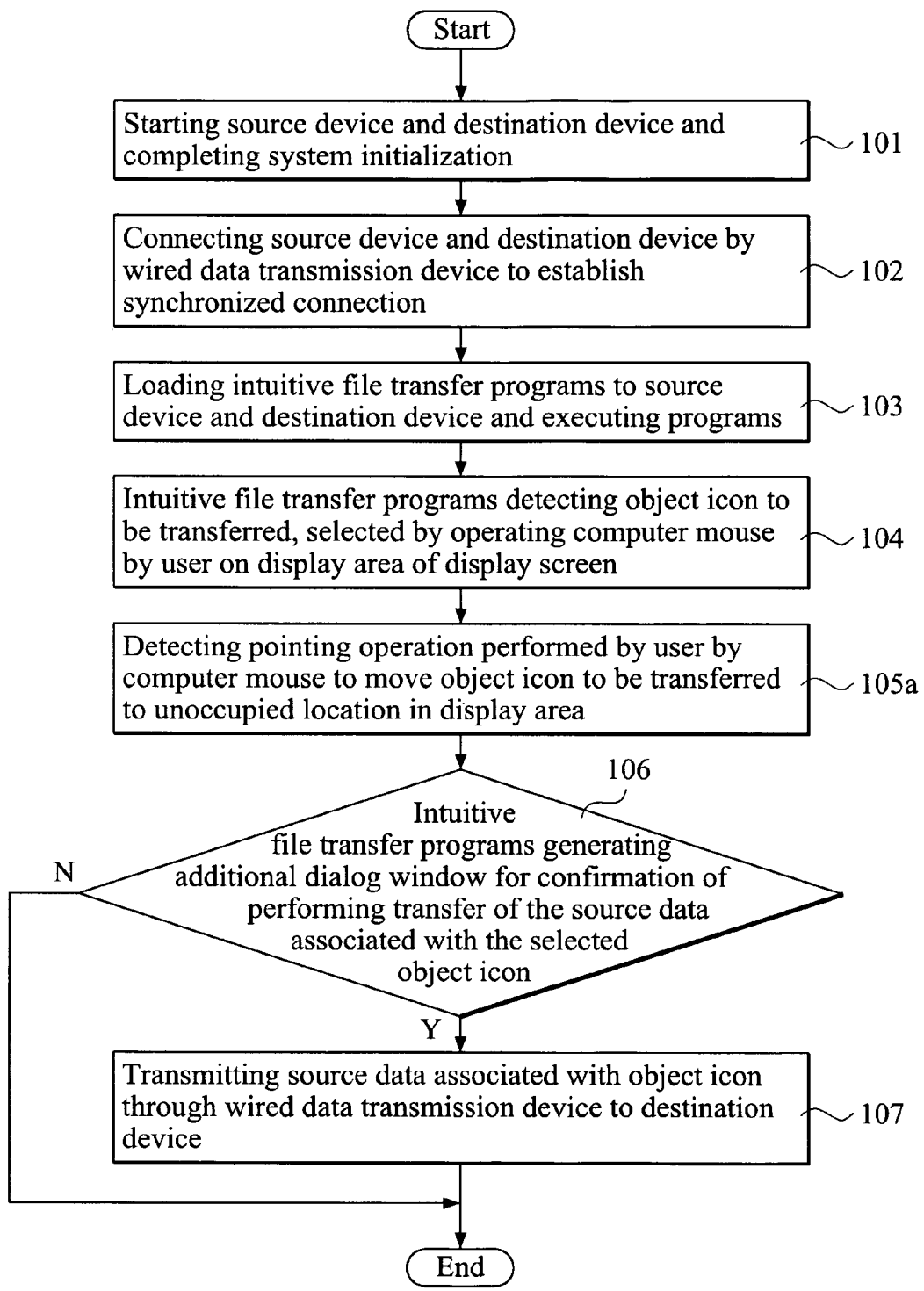
FIG. 6 shows a flow chart of an intuitive file transfer method in accordance with a second embodiment of the present invention.

Referring to FIG. 6, a flow chart of the intuitive file transfer method in accordance with a second embodiment of the present invention is shown. In the second embodiment, most of the steps are identical to the counterpart steps of the embodiment shown in FIG. 3 and for simplicity and consistency, those identical steps will be designated with the same reference numerals.

Figure 7:
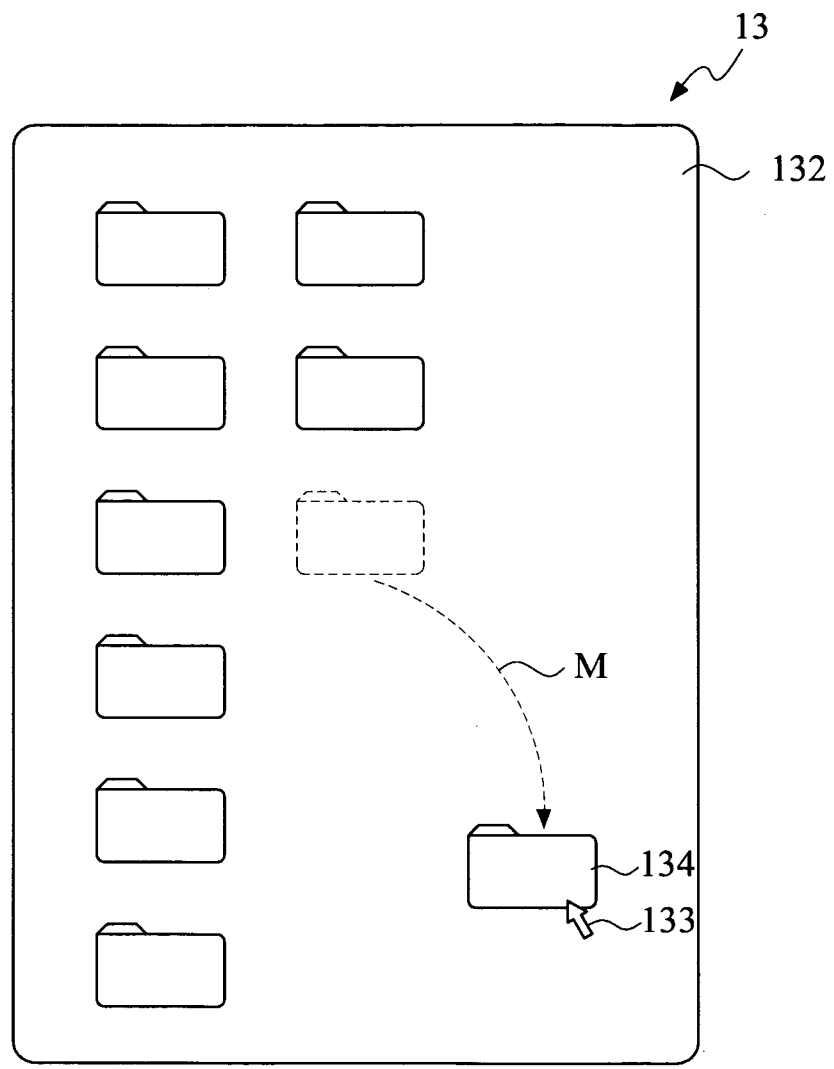
FIG. 7 is a schematic view demonstrating moving an object icon to an unoccupied location in a display area with a computer mouse.

In the flow of the embodiment of FIG. 3, Step 105 is performed to have the intuitive file transfer programs detecting a user using a mouse to drag an object icon to be transferred to a designated boundary of the display area, but in the flow of the second embodiment (as shown in FIG. 6), Step 105a replaces the original Step 105 and is performed to have the intuitive file transfer programs detecting a moving trace M (see FIG. 7) along which a user moves an object icon 134 to be transferred to an unoccupied location in the display area by using a computer mouse to control a screen cursor 133.

Figure 8:
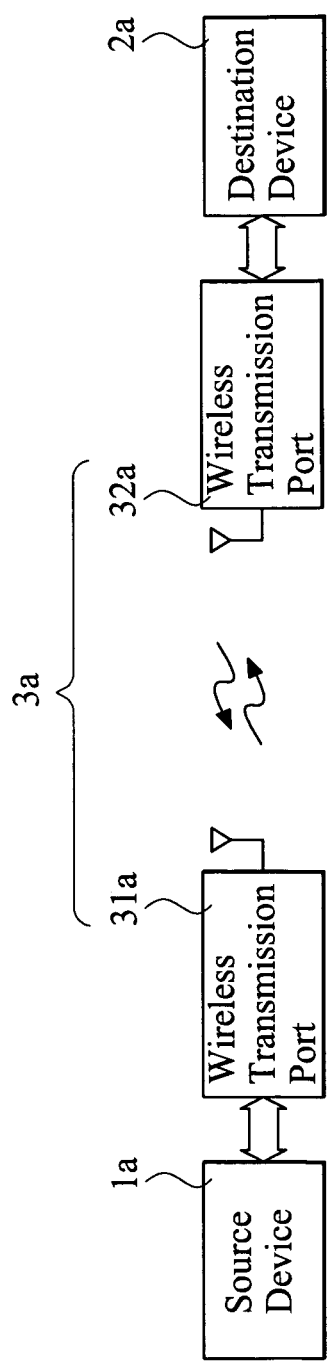
FIG. 8 shows a system block diagram for wireless transfer with the intuitive file transfer method in accordance with the present invention.

FIG. 8 shows a system block diagram for wireless transfer with an intuitive file transfer method in accordance with the present invention. The system of the present invention comprises a source device 1a, a destination device 2a, and a data transmission device 3a, and the source device 1a is set in connection with the destination device 2a with the data transmission device 3a. The data transmission device 3a comprises a wireless transmission port 31a connected to the source device 1a and a wireless transmission port 32a connected to the destination device 2a for transmitting data from the source device 1a to the destination device 2a.

Figure 9:
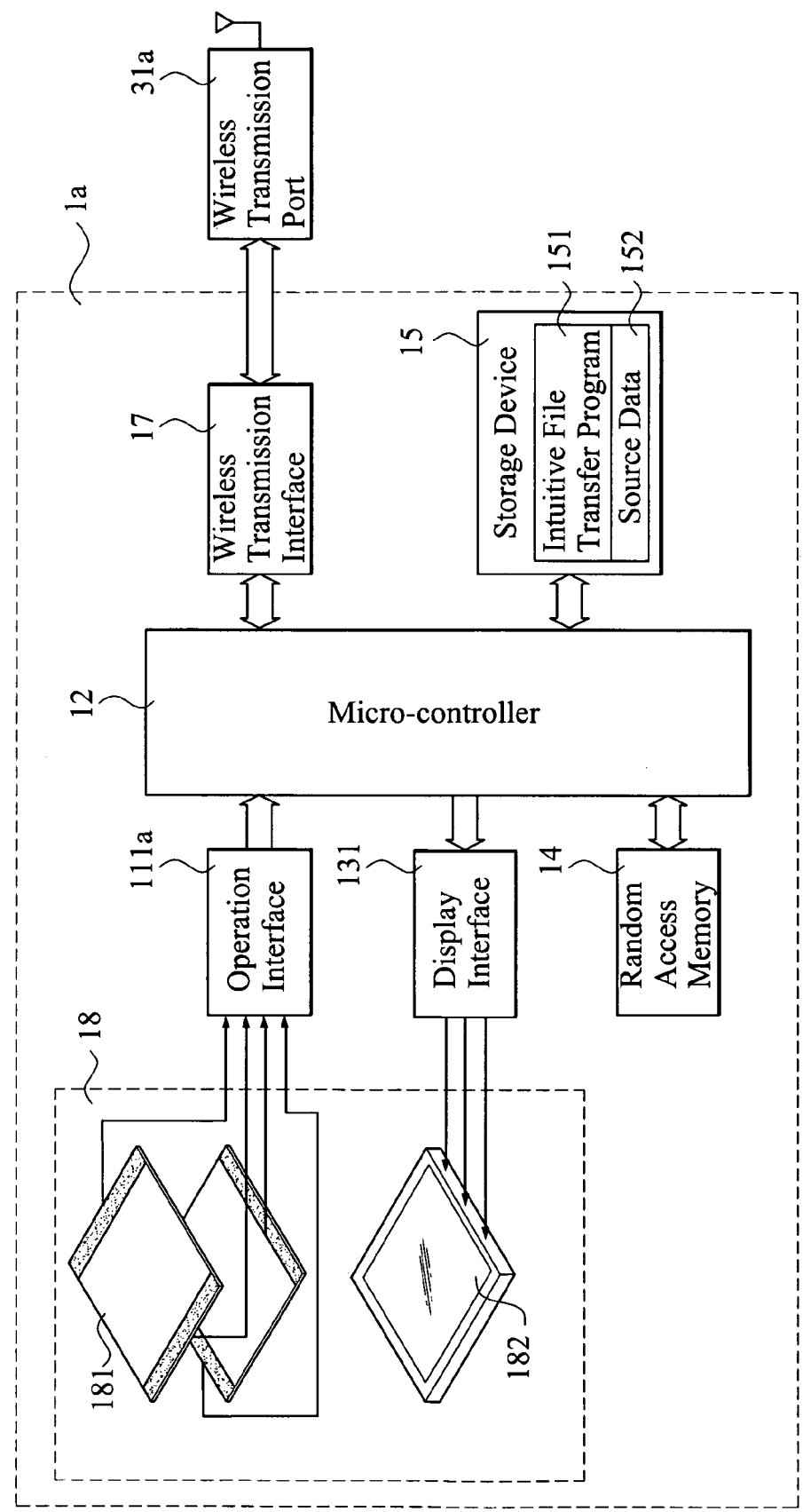
FIG. 9 shows a system block diagram of a source device of the embodiment shown in FIG. 8.

FIG. 9 shows a system block diagram of the source device of the embodiment shown in FIG. 8. The source device 1a comprises a micro-controller 12 connected to an operation interface 111a, a display interface 131, a random access memory 14, a storage device 15, and a wireless transmission interface 17. The storage device 15 stores an intuitive file transfer program 151 and source data 152. The wireless transmission interface 17 is set in connection with the wireless transmission device 31a.

A touch screen 18 is composed of a touch panel 181 that is composed of upper and lower touch layers and a display screen 182, which are respectively connected to the micro-controller 12 by the operation interface 111a and the display interface 131. The touch screen 18, upon touched, generates a touch signal that is transmitted to the micro-controller 12 through the operation interface 111a, and the display screen 182 receives, through the display interface 131, an image signal generated by the micro-controller 12 and displays the image signal on the screen.

Further, the destination device of the embodiment of FIG. 8 has the same system architecture as the source device shown in the system block diagram of FIG. 9.

Figure 10:
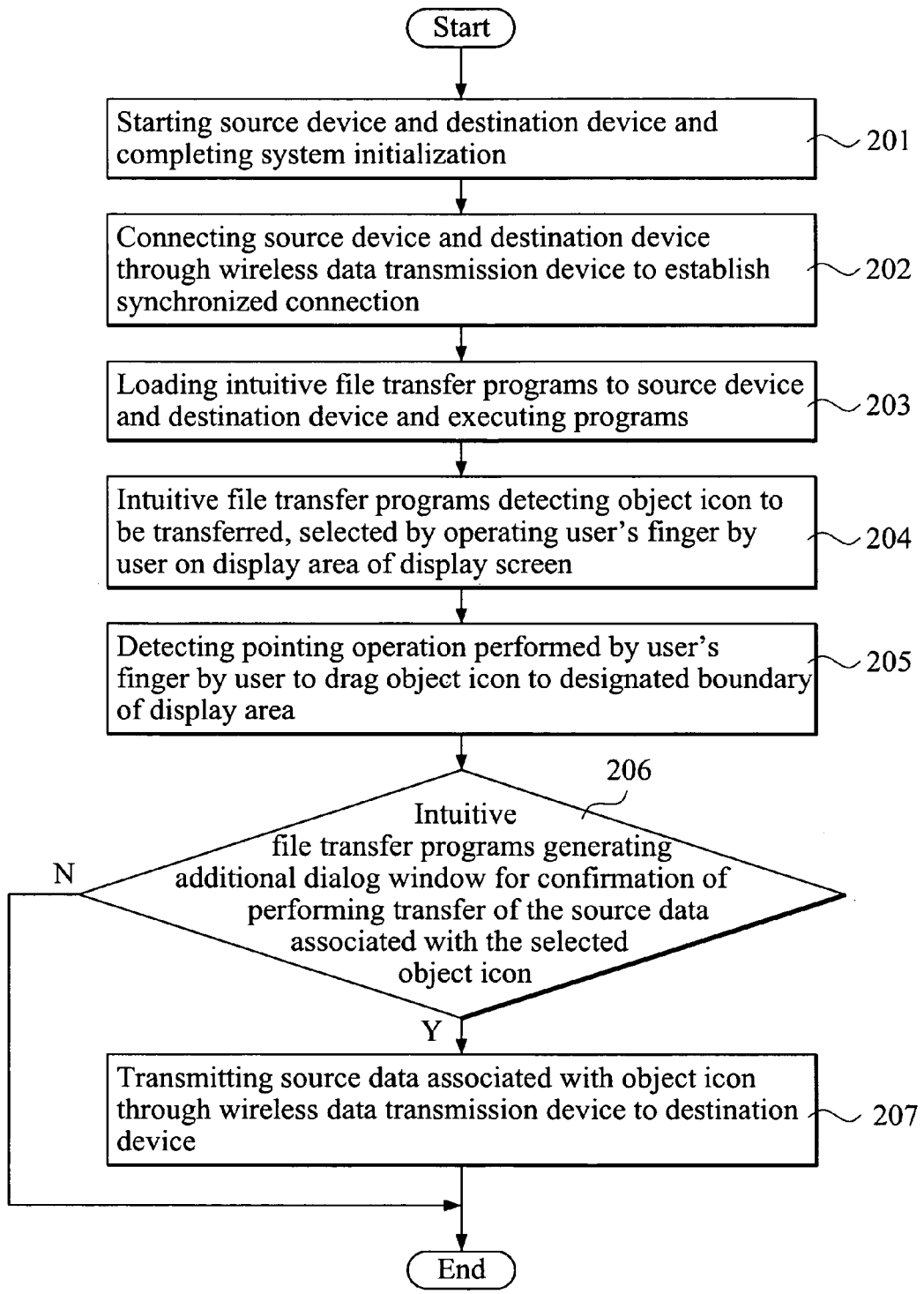
FIG. 10 shows a flow chart of an intuitive file transfer method in accordance with a third embodiment of the present invention.

Referring to FIG. 10, a flow chart of an intuitive file transfer method in accordance with a third embodiment of the present invention is shown. Firstly, both the source device and the destination device are started up and system initialization is completed (Step 201), and connection between the source device and the destination device is established through the wireless data transmission devices connected respectively thereto so as to establish synchronized connection (Step 202).

Figure 11:
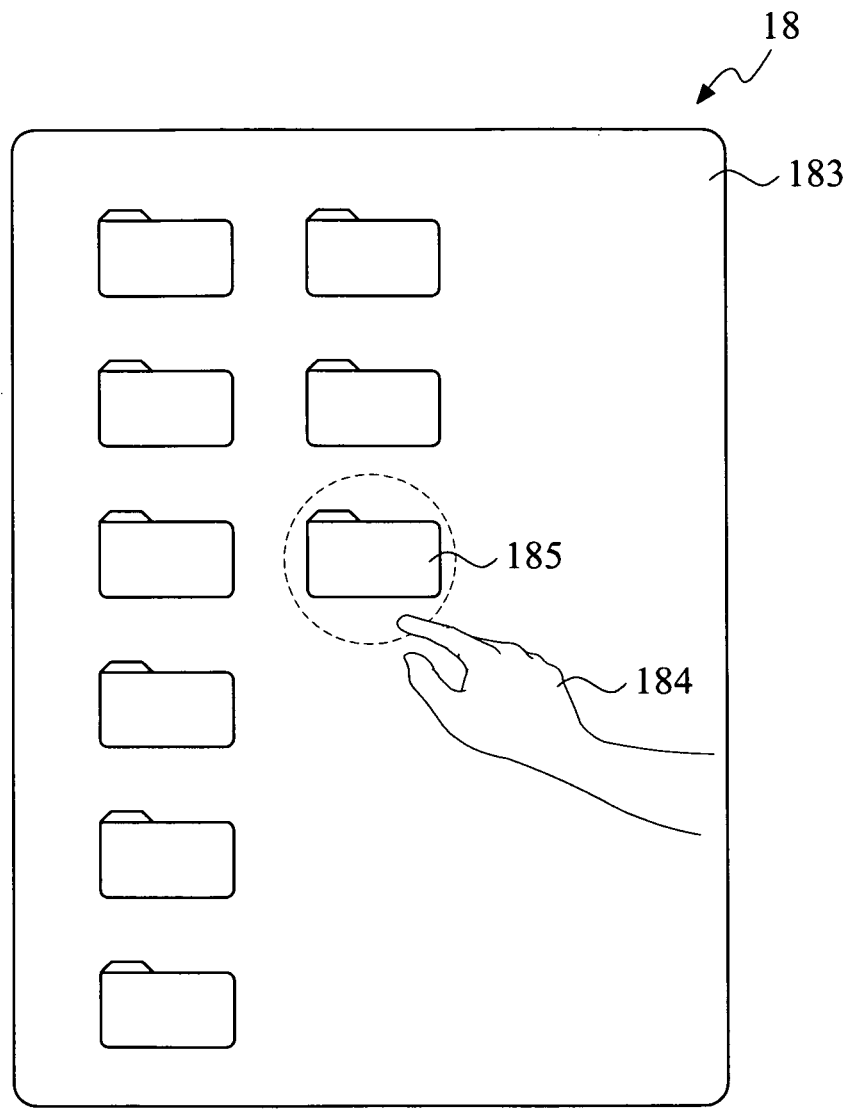
FIG. 11 is a schematic view demonstrating selection of an object icon in a display area with a user's finger.

To perform the intuitive file transfer method in accordance with the present invention, the source device and the destination device are loaded with intuitive file transfer programs in storage devices thereof and the programs are executed in the random access memories connected to the micro-controllers (Step 203). The intuitive file transfer programs start and detect an object icon 185 to be transferred, as indicated by a phantom line circle of FIG. 11 in a display area 183 of the touch screen 18, selected by a user by operating a pointing device, such as the user's finger 184 or a stylus, to touch the object icon (Step 204).

Figure 12:
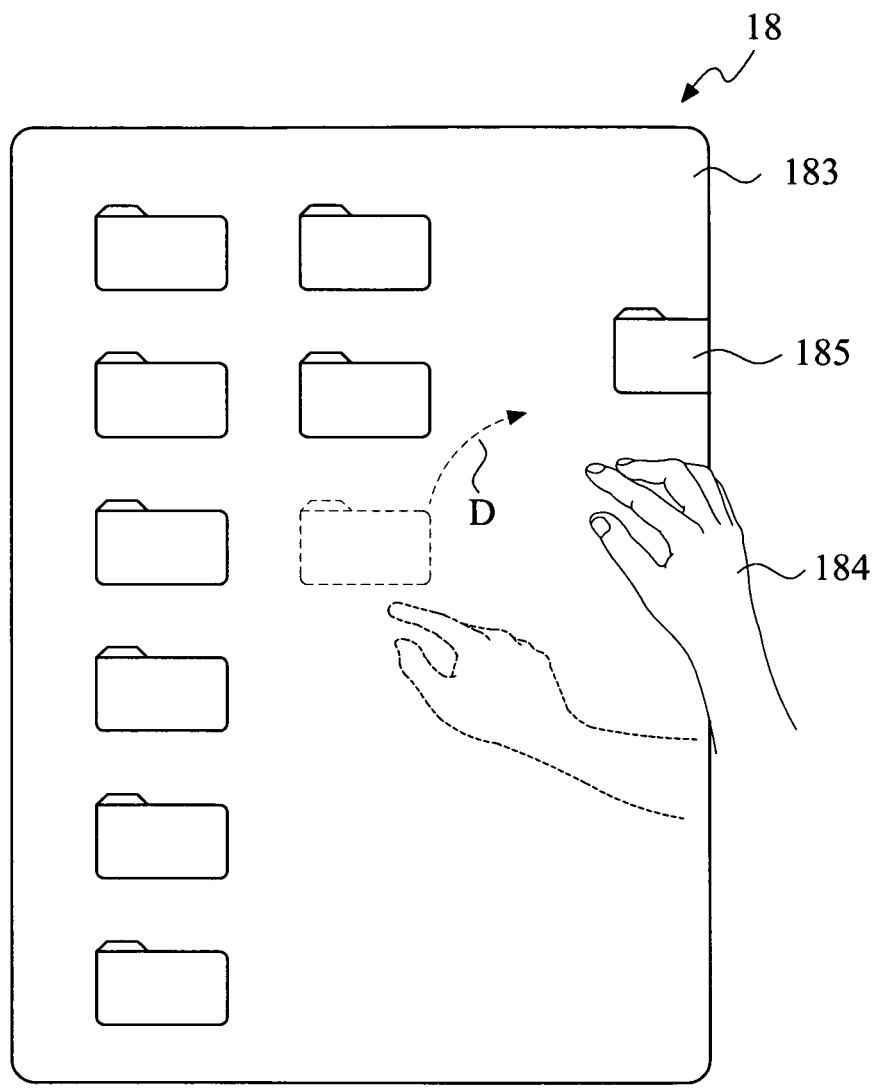
FIG. 12 is a schematic view demonstrating dragging a selected object icon to a boundary of the display area with the user's finger.

Further, the intuitive file transfer programs also detect a pointing operation performed by the user, such as the user's finger touching and moving on the touch screen 18 to drag the object icon 185 (see FIG. 12), along a dragging trace D to a designated boundary of the display area 183 (Step 205). When the object icon is moved to the designated boundary of the display area, the intuitive file transfer programs generate an additional dialog window for confirmation of performing transfer of the source data that are associated with the selected object icon (Step 206).

After confirmation, the intuitive file transfer programs in accordance with the present invention transmit the source data, such as files or file folders, which are associated with the object icon, through connection established with wireless transmission protocols between the wireless data transmission devices to the storage device of the destination device (Step 207). If the confirmation is denied, then the flow skips Step 207 and ends.

Figure 13:
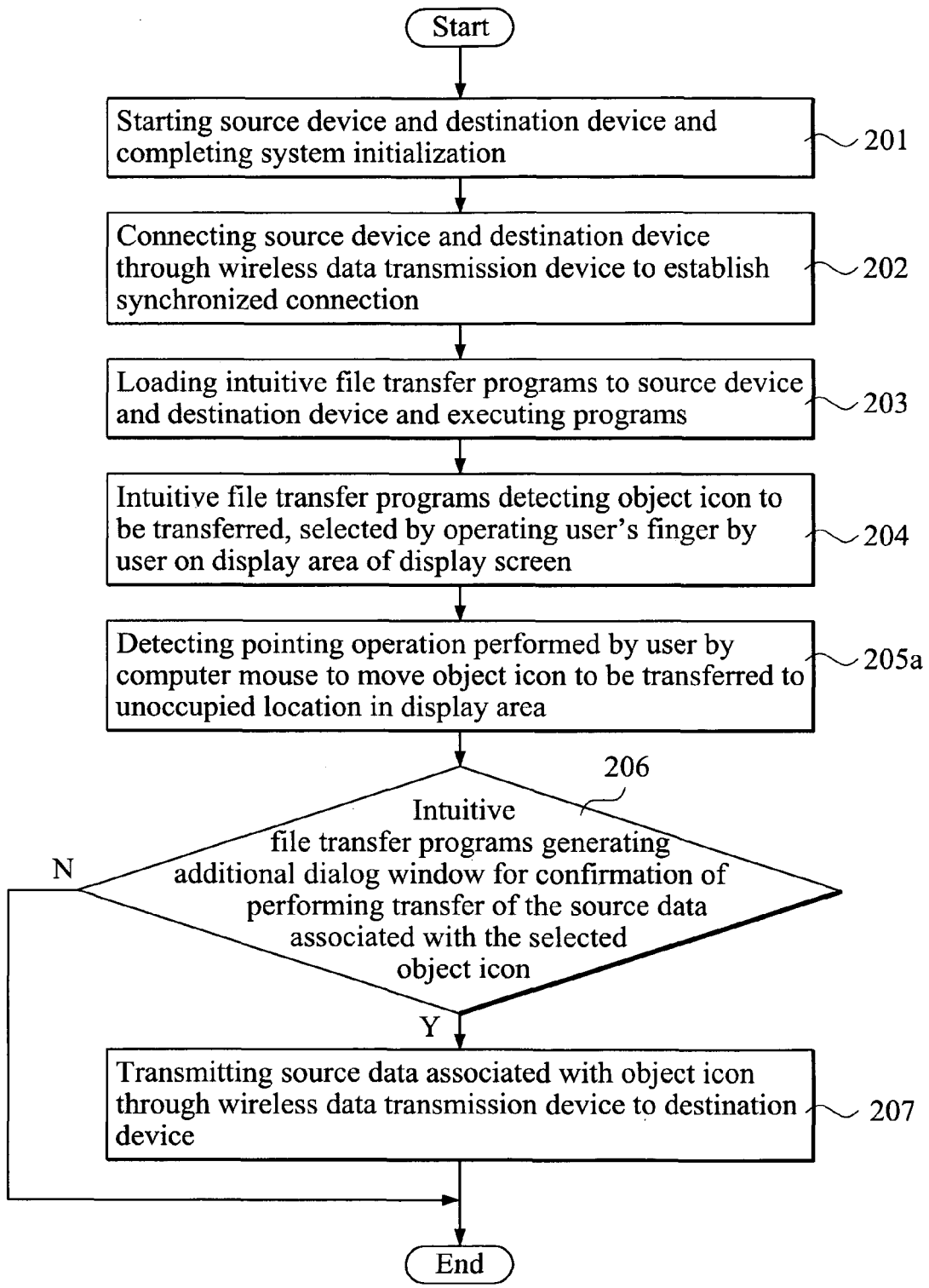
FIG. 13 shows a flow chart of an intuitive file transfer method in accordance with a fourth embodiment of the present invention.

Referring to FIG. 13, a flow chart of an intuitive file transfer method in accordance with a fourth embodiment of the present invention is shown. In the fourth embodiment, most of the steps are identical to the counterpart steps of the embodiment shown in FIG. 10 and for simplicity and consistency, those identical steps will be designated with the same reference numerals.

Figure 14:
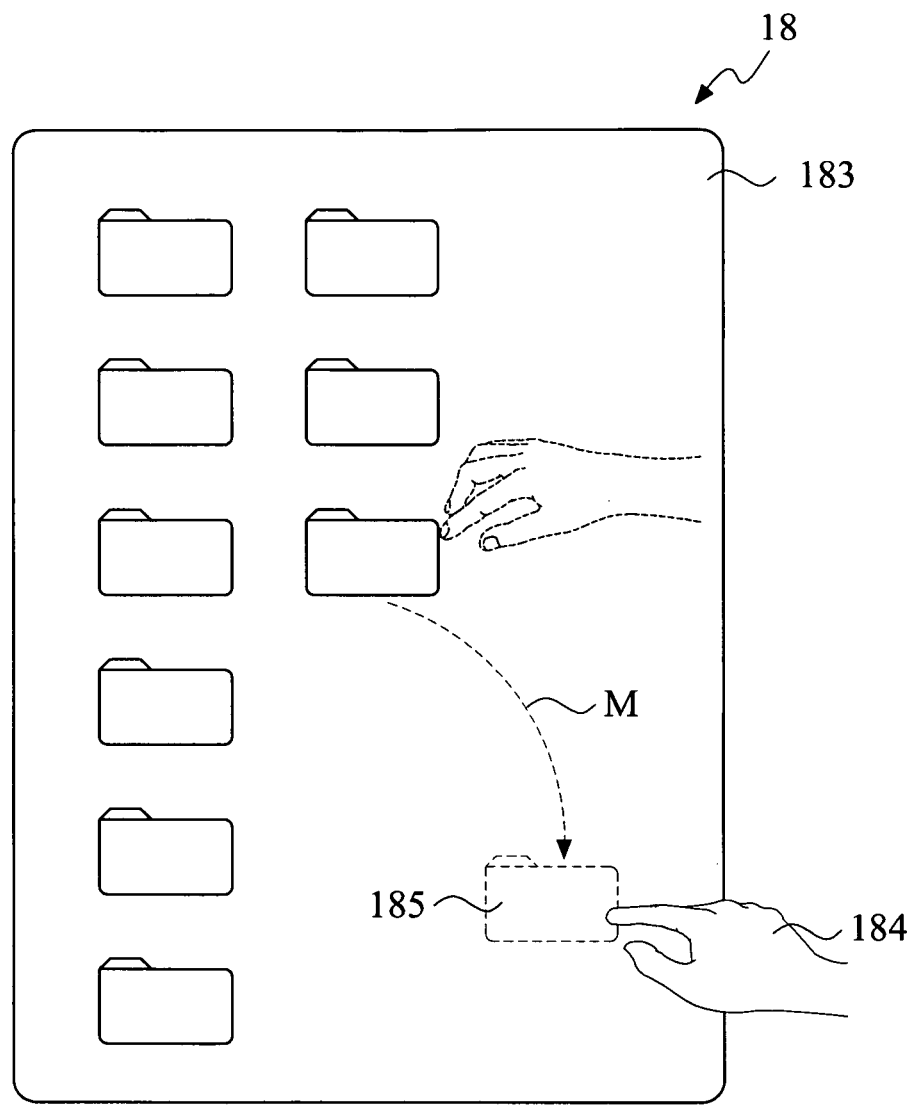
FIG. 14 is a schematic view demonstrating moving an object icon to an unoccupied location in a display area with a user's finger.

In the flow of the embodiment of FIG. 10, Step 205 is performed to have the intuitive file transfer programs detecting a user touching his or her finger to the touch screen 18 to drag an object icon to be transferred to a designated boundary of the display area 183, but in the flow of the fourth embodiment (as shown in FIG. 13), Step 205a replaces the original Step 205 and is performed to have the intuitive file transfer programs detecting a pointing operation that sets a moving trace M (see FIG. 14) along which a user touches his or her finger 184 on the touch screen 18 to move an object icon 185 to be transferred to an unoccupied location on the display area 183.

Figure 15:
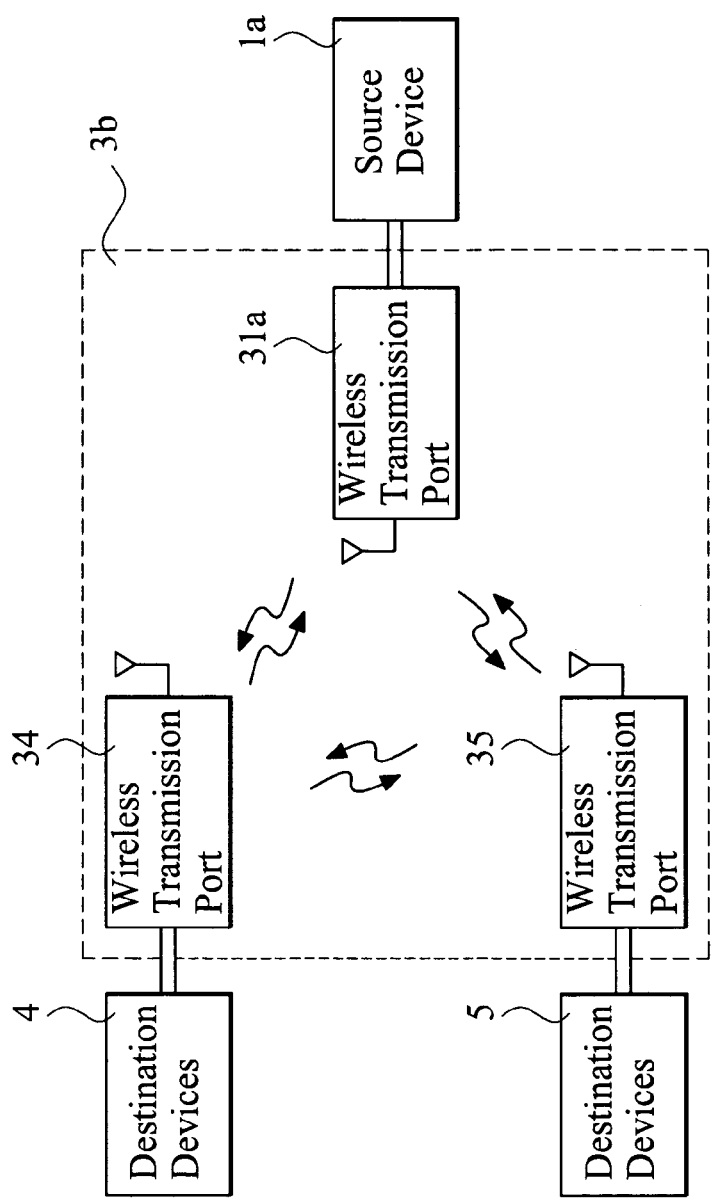
FIG. 15 shows a system block diagram for wireless transfer in a piconet with an intuitive file transfer method in accordance with the present invention.

FIG. 15 shows a system block diagram for wireless transfer in a piconet with an intuitive file transfer method in accordance with the present invention. The system of the present invention comprises a source device 1a, destination devices 4, 5, and a data transmission device 3b, and the source device 1a is set in connection with the destination devices 4, 5 with the data transmission device 3b. The data transmission device 3b comprises a wireless transmission port 31a connected to the source device 1a and a wireless transmission port 34, 35 connected to each of the destination devices 4, 5 for transmitting data from the source device 1a to a target device, such as the destination device 4 or the destination device 5.

Figure 16:
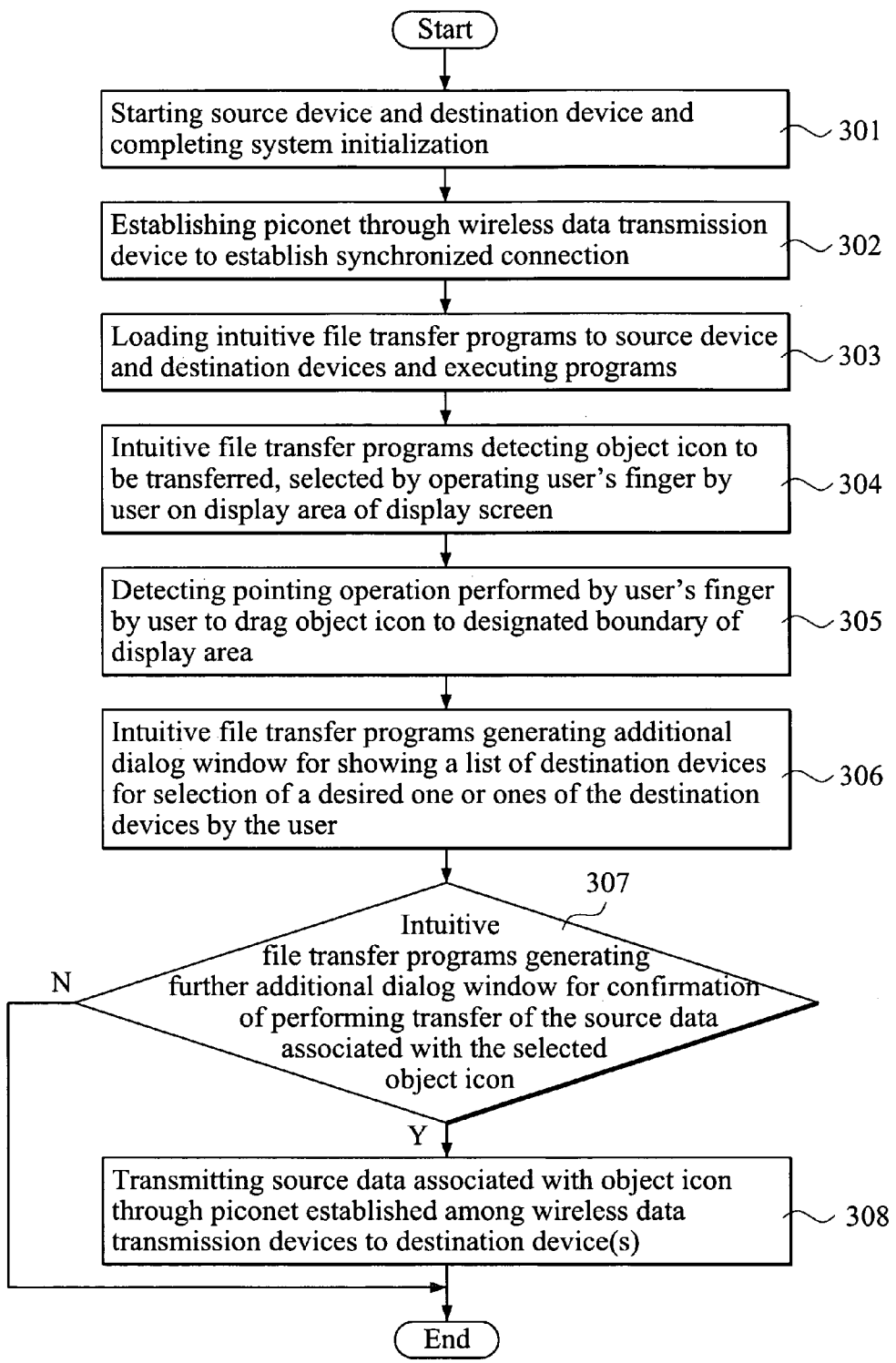
FIG. 16 shows a flow chart of an intuitive file transfer method in accordance with a fifth embodiment of the present invention.

Referring to FIG. 16, a flow chart of an intuitive file transfer method in accordance with a fifth embodiment of the present invention is shown. Firstly, both the source device and the destination devices are started up and system initialization is completed (Step 301), and a piconet is established through the wireless data transmission devices connected to the source device and the destination devices so as to establish synchronized connection (Step 302).

To perform the intuitive file transfer method in accordance with the present invention, the source device and the destination devices are loaded with intuitive file transfer programs in storage devices thereof and the programs are executed in the random access memories connected to the micro-controllers (Step 303). The intuitive file transfer programs start and detect an object icon 185 to be transferred in a display area of a touch screen selected by a user touching his or her finger to the object icon (Step 304).

Further, the intuitive file transfer programs also detect a pointing operation performed by the user, such as the user's finger touching and moving on the touch screen to drag the object icon to a designated boundary of the display area (Step 305). When the object icon is moved to the designated boundary of the display area, the intuitive file transfer programs generate an additional dialog window that shows a list of destination devices for selection of a desired one or ones of the destination devices by the user (Step 306).

After the selection of the desired destination device(s), the intuitive file transfer programs generate a further additional dialog window for confirmation of performing transfer of the source data that are associated with the selected object icon to the destination devices selected by the user (Step 307).

After confirmation, the intuitive file transfer programs in accordance with the present invention transmit the source data of the source device, such as files or file folders, which are associated with the object icon, through the piconet established among the wireless data transmission devices to the storage device(s) of the selected destination device(s) (Step 308). If the confirmation is denied, then the flow skips Step 308 and ends.

Although the present invention has been described with reference to the preferred embodiments thereof and the best mode for carrying the invention, it is apparent to those skilled in the art that a variety of modifications and changes may be made without departing from the scope of the present invention which is intended to be defined by the appended claims.

What is claimed is:

1. An intuitive file transfer method, which is adapted to transfer a selected file from a source device to at least one selected destination device, the source device being connected to the destination device through a data transmission device, the source device and the destination device each comprising a storage device and loaded with an intuitive file transfer program, the source device comprising a touch screen, the method comprising the following steps:

(a) after initialization, operating the source device and the destination device to start the intuitive file transfer programs thereof in connection with a display area of the touch screen, wherein the display area includes locations occupied by object icons and locations unoccupied by object icons;

(b) detecting selection of an object icon to be transferred, which is associated with at least one source data stored in the storage device of the source device, in the display area of the touch screen by a user using a pointing device;

(c-1) detecting movement of the selected object icon caused by a predetermined pointing operation carried out by the user, wherein the predetermined pointing operation comprises moving the object icon to an unoccupied location in the display area;

(c-2) on detecting of the movement of the selected object icon caused by the predetermined pointing operation, operating the intuitive file transfer programs to generate a selection window showing a list containing a plurality of destination devices to allow for selection of a desired destination device among the plurality of destination devices by the user;

(c-3) on the selection of the desired destination device, operating the intuitive file transfer programs to generate a dialog window for confirmation of transferring the source data associated with the selected object icon to the desired destination device by the user; and (d) operating the intuitive file transfer programs to transmit the source data associated with the selected object icon through the data transmission device to the storage device of the desired destination device.

2. The method as claimed in claim 1, wherein the data transmission device comprises a wired data transmission device connected between the source device and the destination device.

3. The method as claimed in claim 1, wherein the data transmission device comprises a wireless data transmission device that establishes connection between the source device and the destination device.

4. The method as claimed in claim 1, wherein the data transmission device establishes synchronized connection between the source device and the destination device.

5. The method as claimed in claim 1, wherein in step (b), the pointing device comprises a finger that touches and selects the object icon to be transferred in the display area.

6. The method as claimed in claim 1, wherein in step (b), the pointing device comprises a stylus that touches and selects the object icon to be transferred in the display area.

7. The method as claimed in claim 1, wherein in step (b), the source data comprise a file.

8. The method as claimed in claim 1, wherein in step (b), the source data comprises a file folder.

9. An intuitive file transfer method, which is adapted to transfer a selected file from a source device to at least one selected destination device, the source device being connected to the destination device through a data transmission device, the source device and the destination device each comprising a storage device and loaded with an intuitive file transfer program, the source device comprising a display screen, the method comprising the following steps:

(a) after initialization, operating the source device and the destination device to start the intuitive file transfer programs thereof in connection with a display area of the display screen, wherein the display area includes locations occupied by object icons and locations unoccupied by object icons;

(b) detecting selection of an object icon to be transferred, which is associated with at least one source data stored in the storage device of the source device, in the display area of the display screen by a user using a screen cursor control device;

(c-1) detecting movement of the selected object icon caused by a predetermined pointing operation carried out by the user, wherein the predetermined pointing operation comprises moving the object icon to an unoccupied location in the display area;

(c-2) on detecting of the movement of the selected object icon caused by the predetermined pointing operation, operating the intuitive file transfer programs to generate a selection window showing a list containing a plurality of destination devices to allow for selection of a desired destination device among the plurality of destination devices by the user;

(c-3) on the selection of the desired destination device, operating the intuitive file transfer programs to generate a dialog window for confirmation of transferring the source data associated with the selected object icon to the desired destination device by the user; and (d) operating the intuitive file transfer programs to transmit the source data associated with the selected object icon through the data transmission device to the storage device of the desired destination device.

10. The method as claimed in claim 9, wherein the data transmission device comprises a wired data transmission device connected between the source device and the destination device.

11. The method as claimed in claim 9, wherein the data transmission device comprises a wireless data transmission device that establishes connection between the source device and the destination device.

12. The method as claimed in claim 9, wherein the data transmission device establishes synchronized connection between the source device and the destination device.

13. The method as claimed in claim 9, wherein in step (b), the screen cursor control device comprises a computer mouse that clicks and selects the object icon to be transferred in the display area.

14. The method as claimed in claim 9, wherein in step (b), the screen cursor control device comprises a track ball that selects the object icon to be transferred in the display area.

15. The method as claimed in claim 9, wherein in step (b), the screen cursor control device comprises a touch panel that selects the object icon to be transferred in the display area.

16. The method as claimed in claim 9, wherein in step (b), the source data comprise a file.

17. The method as claimed in claim 9, wherein in step (b), the source data comprises a file folder.

* * * * *